United States Patent Office 2,899,433
Patented Aug. 11, 1959

2,899,433

PROCESS FOR THE PRODUCTION OF MELAMINE AND GUANIDINE SULPHAMATE

Joseph Newton Robinson and Frederick John Leslie Miller, Trail, British Columbia, and Basil McDonnell, Rossland, British Columbia, Canada, assignors to The Consolidated Mining and Smelting Company of Canada Limited, Montreal, Quebec, Canada, a company of Canada No Drawing. Application November 19, 1956
Serial No. 622,825

5 Claims. (Cl. 260—249.7)

This invention relates to the synthesis of melamine or of guanidine sulphamate or of mixtures thereof. It is directed particularly to providing a continuous process for the production of either or both of these compounds from urea, sulphur dioxide and ammonia.

The method of the present invention is an improvement in the process for producing melamine or guanidine sulphamate or mixtures thereof by synthesis from urea, ammonia and sulphur dioxide. The improvement consists in treating the reactants in a preliminary reaction zone whereby the reactants are thoroughly mixed at a temperature lower than that of the subsequent main reaction zone and whereby reaction between sulphur dioxide and ammonia takes place before the reaction mixture is subjected to final synthesis conditions for formation of the desired product.

Melamine and guanidine sulphamate can be produced by reacting a mixture of urea, ammonia and sulphur dioxide at elevated temperature and under a superatmospheric pressure of ammonia. The reaction for melamine production may be represented by the equation:

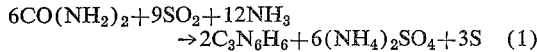

$$6CO(NH_2)_2 + 9SO_2 + 12NH_3$$
$$\rightarrow 2C_3N_6H_6 + 6(NH_4)_2SO_4 + 3S \quad (1)$$

The ammonia pressure may vary from 200 to 1000 pounds per square inch and higher and is preferably at least about 500 pounds per square inch. This pressure is provided by adding to the reaction mixture ammonia in excess of the amount required for the reaction according to Equation 1 above.

The temperature to which the reaction mixture is heated to form melamine may be within the range of 260° C. to 360° C., preferably 280° C. to 330° C. At temperatures below about 280° C., the reaction to form melamine normally takes place very slowly, requiring several hours to obtain even a relatively small yield of about 10% of the theoretical yield based on the carbon content of the urea charged to the reaction vessel.

At temperatures above about 330° C., the reaction proceeds rapidly but the rate of decomposition of melamine is also relatively rapid at these higher temperatures.

The time required to produce a reasonable yield of melamine varies from many hours at about 260° C. to a few minutes at 360° C. and higher. Within the preferred temperature range of 280° C. to 330° C. the time of retention may be from one to four hours.

The mol ratio of sulphur dioxide to urea in the reaction mixture may vary within the range of from 1:1 to 6:1 but is preferably close to the theoretical ratio of 1½:1.

The synthesis reaction to produce melamine is effected by passing the reactants into a synthesis reaction vessel, such as an autoclave, wherein the above-mentioned condition of pressure and temperature are maintained. The urea may be melted before it is charged to the autoclave, and the sulphur dioxide and ammonia may be pumped to the autoclave as liquids and vapourized immediately before injection into the autoclave. Guanidine sulphamate may be added to the reaction vessel admixed with the urea to assist in maintaining fluidity of the reaction product. A mixture of urea and guanidine sulphamate has a low melting temperature and may be readily pumped in the molten state. All the materials charged to the reaction vessel preferably are dry.

The yield of melamine under a typical set of operating conditions suitable for continuous operation, 300° C., 500 pounds per square inch ammonia pressure, 3 hours retention time, a mol ratio of $SO_2$ to urea of about 1½:1, and added guanidine sulphamate in the ratio of 0.8 to 2.3 mols per mol urea, is about 45% of the theoretical yield based on the carbon content of the urea and added guanidine sulphamate.

In the complete process for the production of melamine, the reaction product from the synthesis vessel is passed to a cooling vessel in which the temperature of the reaction product is lowered to about 200° C. or less by evaporation of ammonia, and then to a pressure-release vessel in which the pressure is reduced to atmospheric by release of ammonia. The ammonia evolved in the cooling step and pressure-release step may be recovered and returned to the process. After the pressure release step, the reaction product is treated by aqueous extraction methods for the separation and recovery of the various constituents of the reaction product. The reaction product contains guanidine sulphamate and ammonium sulphate, which can be dissolved in cold water and thus separated from melamine and other insoluble material. The solution can be treated to separate guanidine sulphamate from ammonium sulphate and the guanidine sulphamate can be withdrawn from the process or returned to the reaction vessel. The melamine residue can be leached with hot water to dissolve melamine, thereby separating it from sulphur and other insoluble material. The hot melamine solution is treated for the separation and recovery of pure melamine.

Although this process has many advantages, we have found in the continuous operation of the process that when the reactants, urea, sulphur dioxide and ammonia, are charged directly into the melamine synthesis zone, wherein the temperature is preferably between 280° C. and 330° C., sulphur dioxide does not appear to react completely, or, if it does, the resultant products are decomposed to some extent under melamine synthesis conditions, with the result that sulphur dioxide is present as such in the material discharged from the synthesis reaction vessel. This sulphur dioxide reacts with ammonia in subsequent steps of the process, resulting in the formation of compounds which in some cases solidify in pipes, valves and other parts of the process equipment causing difficulty in maintaining continuous operation. Also, these compounds contaminate the product and complicate the procedures for separating and recovering in pure form the desired end product or products from the reaction product. Some of these undesirable compounds result in the formation of thiosulphates in solution when the reaction product is treated with water during the separation stages of the process.

We have found that this difficulty with sulphur dioxide can be largely overcome by first charging all the reactants to a preliminary reaction zone maintained at a lower temperature than that of the main synthesis reaction zone. In this preliminary reaction zone, the reacting materials are thoroughly mixed, and the initial reaction between sulphur dioxide and ammonia takes place before the reaction mixture is passed to the second, or main reaction zone. In this initial reaction, ammonium sulphamate and other ammonia-sulphur dioxide compounds may be formed.

The reaction mixture discharged from the preliminary reaction zone contains urea, ammonia, the ammonia-sulphur dioxide compounds and also any guanidine sulphamate that may have been included in the material fed to the preliminary reaction zone. The reaction mixture is then passed to the main reaction zone, which may consist of one autoclave, or two or more autoclaves in series, wherein the reaction to form melamine is conducted.

In the preliminary vessel, or mixing vessel, the reaction mixture is heated to a temperature between 200° C. and 280° C., preferably between 240° C. and 260° C. The time of retention of the mixture in the preliminary vessel need only be a few minutes, for example, 1 to 5 minutes, as the reactions between $SO_2$ and $NH_3$ occur very rapidly. The mixture could be retained in this preliminary vessel for a longer period, for example, 1 hour, and some guanidine sulphamate, and possibly some melamine, might be formed. However, this would be impractical and uneconomic as a method for producing guanidine sulphamate or melamine and in normal operation a retention time of a few minutes is all that is required.

We prefer to conduct the synthesis stage of the process, that is, those steps of the complete process prior to aqueous extraction steps for the separaion of constituents of the reaction product, in a series of separate vessels, for example, a preliminary, or mixing vessel, two main reaction autoclaves, a cooling vessel and a pressure-release vessel. In our preferred method of operation, liquid ammonia is pumped into a molten mixture of urea and guanidine sulphamate and liquid sulphur dioxide is injected into this mixture just before the mixture enters the mixing vessel. The mixture is heated at the entrance to the mixing vessel and the ammonia and sulphur dioxide enter the mixing vessel in the gaseous state. They react in the mixing vessel to form a product that is liquid at the prevailing temperature. The contents of the mixing vessel consist of gaseous ammonia and a liquid mixture of ammonia, urea, guanidine sulphamate and the reaction products of sulphur dioxide and ammonia, such as ammonium sulphamate and certain intermediate compounds.

The reactions between sulphur dioxide and ammonia generate sufficient heat to maintain the desired temperature in the mixing vessel.

A preferred form of mixing vessel is a vertical cylindrical shell of mild steel or stainless steel lined with carbon or ceramic brick with a thin sheet of polymerized tetrafluoroethylene, such as that sold under the trade name "Teflon," between the steel and the brick. The vessel may be open or packed, for example, with ceramic rings. As the contents of this vessel consist of gaseous ammonia and a liquid mixture, we prefer, for ease of construction of the vessel and operation of the method, to pass the reaction mixture downwardly through the vessel, introducing the reactants into the vessel at the top and discharging the vessel from the bottom. Preferably, the reaction mixture is discharged through a pipe or tube projecting a few inches above the bottom of the mixing vessel. The liquid reaction mixture forms a pool at the bottom of the vessel and overflows into the discharge pipe. Gaseous ammonia passes with the liquid reaction mixture through the discharge pipe to the main reaction vessel.

The temperature in the upper part of the mixing vessel where the reaction mixture is introduced may be 100° C. to 130° C. The temperature in the lower part of the vessel, from which the reaction mixture is withdrawn, is between 200° C. and 280° C., preferably, as noted previously, between 240° C. and 260° C.

The constituents of the reaction mixture are thoroughly mixed in passing through the mixing vessel, or preliminary reaction zone, thereby facilitating uniform reaction for the formation of melamine in the synthesis autoclave, or main reaction zone. This thorough mixing is effected partly as the reaction material passes downwardly through the mixing vessel but chiefly in the pool at the bottom of the vessel. This pool of molten material is violently agitated by ebullition of ammonia.

The method of producing melamine by heating urea, sulphur dioxide and ammonia can be modified to produce primarily guanidine sulphamate, which is an intermediate compound in the formation of melamine. If the method is to be used to produce primarily guanidine sulphamate, the conditions in the main reaction zone are controlled to provide lower temperatures or shorter retention times to increase the yield of guanidine sulphamate and prevent or reduce the conversion of guanidine to melamine. The improvement of the present invention is also applicable to the production of guanidine sulphamate although in this case the preferred temperature range in the main reaction zone would be from 260° C. to 360° C. with times of retention varying from about 2 hours at 260° C. to about 10 minutes at 360° C. Superatmospheric pressures of ammonia should be used, preferably above about 500 pounds per square inch of ammonia, and the mol ratio of sulphur dioxide to urea should be between 1:1 and 6:1, preferably about 3:1. The addition of guanidine sulphamate to the reaction mixture is not necessary in this modification to maintain fluidity throughout the synthesis stage of the process but the addition of guanidine sulphamate to the urea fed to the process is helpful. Such a mixture has a lower melting point than urea alone and can therefore be more readily pumped and handled in the liquid state. The reaction to form guanidine sulphamate may be expressed as follows:

$$CO(NH_2)_2 + 3SO_2 + 4NH_3 \rightarrow NHC(NH_2)_2 \cdot HSO_3NH_2 + (NH_4)_2SO_4 + S \quad (2)$$

Conditions in the preliminary reaction vessel remain the same as when melamine is to be produced as the primary product.

By carrying out the process for the production of melamine or guanidine sulphamate or both compounds with the incorporation of the preliminary step described above, substantially all the sulphur dioxide is reacted before the reaction product is discharged from the main reaction step and difficulties with undesired compounds of sulphur, such as sulphites and thiosulphates, in subsequent steps are greatly reduced.

It will be understood that modifications may be made in the preferred embodiment of the invention described herein without departing from the scope defined by the appended claims.

What we claim as new and desire to protect by Letters Patent of the United States is:

1. In a continuous process for the production of a compound selected from the group consisting of melamine and guanidine sulphamate by reacting urea, ammonia and sulphur dioxide in a synthesis reaction vessel at a temperature within the range of from about 260° C. to about 360° C. and under a superatmospheric pressure of ammonia, the improvement which comprises the steps of continuously heating the reactants urea, ammonia and sulphur dioxide in a preliminary mixing vessel at a temperature between 200° C. and 280° C. for a period of time sufficient to react sulphur dioxide and ammonia and form a fluid, preliminary reaction mixture which comprises urea, ammonia and ammonia-sulphur dioxide reaction compounds but which is substantially free from sulphur dioxide, continuously passing said fluid preliminary reaction mixture from said preliminary mixing vessel to a synthesis reaction vessel, reacting said fluid preliminary reaction mixture in said synthesis reaction vessel at a temperature within the range of from about 260° C. to about 360° C. and under a superatmospheric pressure of ammonia to produce a reaction product which contains a recoverable amount of a compound selected from the group consisting of melamine and guanidine sulphamate, continuously discharging reaction product from said synthesis reaction vessel, and recovering a compound selected from the group consisting of melamine and guanidine sulphamate from said reaction product.

2. The continuous process for the production of a compound selected from the group consisting of melamine and guanidine sulphamate according to claim 1 in which the reactants urea, sulphur dioxide and ammonia are retained in the preliminary mixing vessel for a period of time within the range of from about 1 to about 5 minutes.

3. The continuous process for the production of a compound selected from the group consisting of melamine and guanidine sulphamate according to claim 1 in which the preliminary mixing vessel is maintained at a temperature within the range of from about 240° C. to about 260° C. and the synthesis reaction vessel is maintained at a temperature within the range of from about 280° C. to about 330° C.

4. The continuous process for the production of melamine according to claim 1 in which guanidine sulphamate is included with the reactants urea, ammonia and sulphur dioxide charged into the preliminary mixing vessel.

5. The continuous process for the production of a compound selected from the group consisting of melamine and guanidine sulphamate according to claim 1 in which urea, ammonia and sulphur dioxide are charged into the upper part of the preliminary mixing vessel and fluid, preliminary reaction mixture is withdrawn from the lower part of said preliminary mixing vessel and passed to the synthesis reaction vessel.

References Cited in the file of this patent

UNITED STATES PATENTS

| 2,768,168 | Robinson et al. | Oct. 23, 1956 |

FOREIGN PATENTS

| 162,088 | Australia | Mar. 21, 1955 |
| 523,926 | Canada | Apr. 17, 1956 |
| 525,270 | Canada | May 22, 1956 |